(12) United States Patent
Zen et al.

(10) Patent No.: US 7,394,805 B2
(45) Date of Patent: Jul. 1, 2008

(54) SYSTEM AND METHOD FOR CONNECTING PORTABLE INFORMATION EQUIPMENT AND EXTENSION TELEPHONE

(75) Inventors: Toshiaki Zen, Kanagawa (JP); Yoshikazu Kobayashi, Kanagawa (JP)

(73) Assignee: NEC Infrontia Corporation, Kanagawa (JP)

( * ) Notice: Subject to any disclaimer, the term of this patent is extended or adjusted under 35 U.S.C. 154(b) by 916 days.

(21) Appl. No.: 10/676,074

(22) Filed: Oct. 2, 2003

(65) Prior Publication Data

US 2004/0105430 A1 Jun. 3, 2004

(30) Foreign Application Priority Data

Nov. 29, 2002 (JP) ............................. 2002-348064

(51) Int. Cl.
*H04L 12/66* (2006.01)
(52) U.S. Cl. ........................................ 370/352; 726/15
(58) Field of Classification Search ................. 370/352; 455/411, 410, 555, 406; 726/15
See application file for complete search history.

(56) References Cited

U.S. PATENT DOCUMENTS

| | | | | |
|---|---|---|---|---|
| 6,993,360 | B2 * | 1/2006 | Plahte et al. | ............... 455/555 |
| 2004/0006708 | A1 * | 1/2004 | Mukherjee et al. | .......... 709/227 |

| | | | |
|---|---|---|---|
| 2005/0227670 | A1 * | 10/2005 | Bicker ........................ 455/411 |

FOREIGN PATENT DOCUMENTS

| | | |
|---|---|---|
| JP | 2000-244639 | 9/2000 |
| JP | 2001-265584 | 9/2001 |
| JP | 2001-331389 | 11/2001 |
| JP | 2002-297755 | 10/2002 |
| WO | WO 01/35616 | 5/2001 |
| WO | WO 01/78317 | 10/2001 |

OTHER PUBLICATIONS

Japanese Office Action dated May 15, 2006 with English translation of pertinent portions.
Japanese Office Action dated Dec. 2, 2003 with English translation of pertinent portions.
"Mastering IP Telephone", Network Magazine, pp. 137-159 (Nov. 2002).
H. Konetomo, "Point-Illustrated VPN/VLAN Textbook" (1999).

* cited by examiner

*Primary Examiner*—Stella Woo
(74) *Attorney, Agent, or Firm*—Witham Curtis Christofferson & Cook, PC (57) ABSTRACT

A system for connecting a portable information equipment and an extension telephone, comprises: an extension telephone connecting device for connecting the portable information equipment to an extension telephone system after authentication through a virtual private network (VPN); and a Voice over Internet Protocol (VoIP) connecting device for connecting the portable information equipment connected to the extension telephone system to the extension telephone connected to the extension telephone system by VoIP. This system enables a temporary staff to make a call from outside to an extension telephone system in a dispatched company while maintaining security.

4 Claims, 9 Drawing Sheets

TELEPHONE SYSTEM MANAGER
USE FEES

⟷

TEMPORARY STAFF
EXTENSION TELEPHONE SYSTEM CONNECTION LICENSE

BRANCH OFFICE EXTENSION TELEPHONE SYSTEM 105
- CUSTOMER INFORMATION DB
- ETHERNET
- WEB SERVER

INTERNET CAFE 102
- PORTABLE INFORMATION EQUIPMENT 103

INTER-SYSTEM LINKAGE

THE INTERNET

HEADQUARTER COMPANY EXTENSION TELEPHONE SYSTEM
- CUSTOMER INFORMATION DB
- ETHERNET
- USER MANAGEMENT DB 104
- WEB SERVER

SYSTEM AND METHOD FOR CONNECTING PORTABLE INFORMATION EQUIPMENT AND EXTENSION TELEPHONE

BACKGROUND OF THE INVENTION

1. Field of the Invention

The present invention relates to a system and method for connecting a portable information equipment and an extension telephone, which connect a portable information equipment such as a personal digital assistance (PDA) to an extension telephone on the company premises or the like.

2. Description of the Related Art

Recent popularity of company business outsourcing has increased scenes in which temporary staffs work at dispatched companies. There is a case in which the temporary staff must make a call to an extension telephone of his/her company for business connection from inside/outside the dispatched company.

There are following conventional art documents relating to the present invention:

Japanese Patent Application No. 2001-265584,
Japanese Patent Application No. 2001-331389,
"Point-Illustrated VPN/VLAN Textbook" by Multimedia Communication Study Group under the editorship of HARUKI KORETOMO, issued by ASCII Publishing Company, Sep. 11, 1999,
"Mastering of IP Telephone" Network Magazine, pp. 137 to 159, issued by ASCII Publishing Company, November 2002.

However, the following disadvantages have been pointed out for telephone usability of the staff dispatched to the company.

(1) A portable telephone or a public telephone must be used to make a call to the dispatched company from the outside. However, a charge for such a call is high. In addition, the temporary staff does not always carry a portable telephone.

(2) The temporary staff cannot use a telephone system of the dispatched company even inside the company.

(3) The temporary staff cannot use telephone system customer information of the dispatched company from the outside.

(4) The dispatched company feels insecure when the temporary staff is permitted to use the company telephone.

Thus, objects of the present invention are to provide a system and method for connecting portable information equipment and an extension telephone, which enable use of an extension telephone of a dispatched company by a temporary staff while maintaining security.

SUMMARY OF THE INVENTION

According to an aspect of the present invention, there is provided a system for connecting a portable information equipment and an extension telephone, comprising: extension telephone connecting means for connecting the portable information equipment to an extension telephone system after authentication through a virtual private network (VPN); and Voice over Internet Protocol (VoIP) connecting means for connecting the portable information equipment connected to the extension telephone system to the extension telephone connected to the extension telephone system by VoIP.

The system may further comprise: charging means for charging to the portable information equipment.

In the system, the portable information equipment may be capable of accessing, by the VPN, a database connected to the VPN.

According to a second aspect of the present invention, there is provided a method for connecting a portable information equipment and an extension telephone, comprising: an extension telephone connecting step of connecting the portable information equipment to an extension telephone system after authentication through a virtual private network (VPN); and a Voice over Internet Protocol (VoIP) connection executing step of connecting the portable information equipment connected to the extension telephone system to the extension telephone connected to the extension telephone system by VoIP.

The method may further comprise: a charging step of charging to the portable information equipment.

In the method, the portable information equipment may be capable of accessing, by the VPN, a database connected to the VPN.

DESCRIPTION OF THE PREFERRED EMBODIMENTS

The present invention is designed to collect connection fees in return for providing a license to a temporary staff to connect to an extension telephone. The invention has a feature that an extension telephone system can be used not only from a fixed terminal of a fixed place but also from freely selected terminals of various places.

Figure 1:
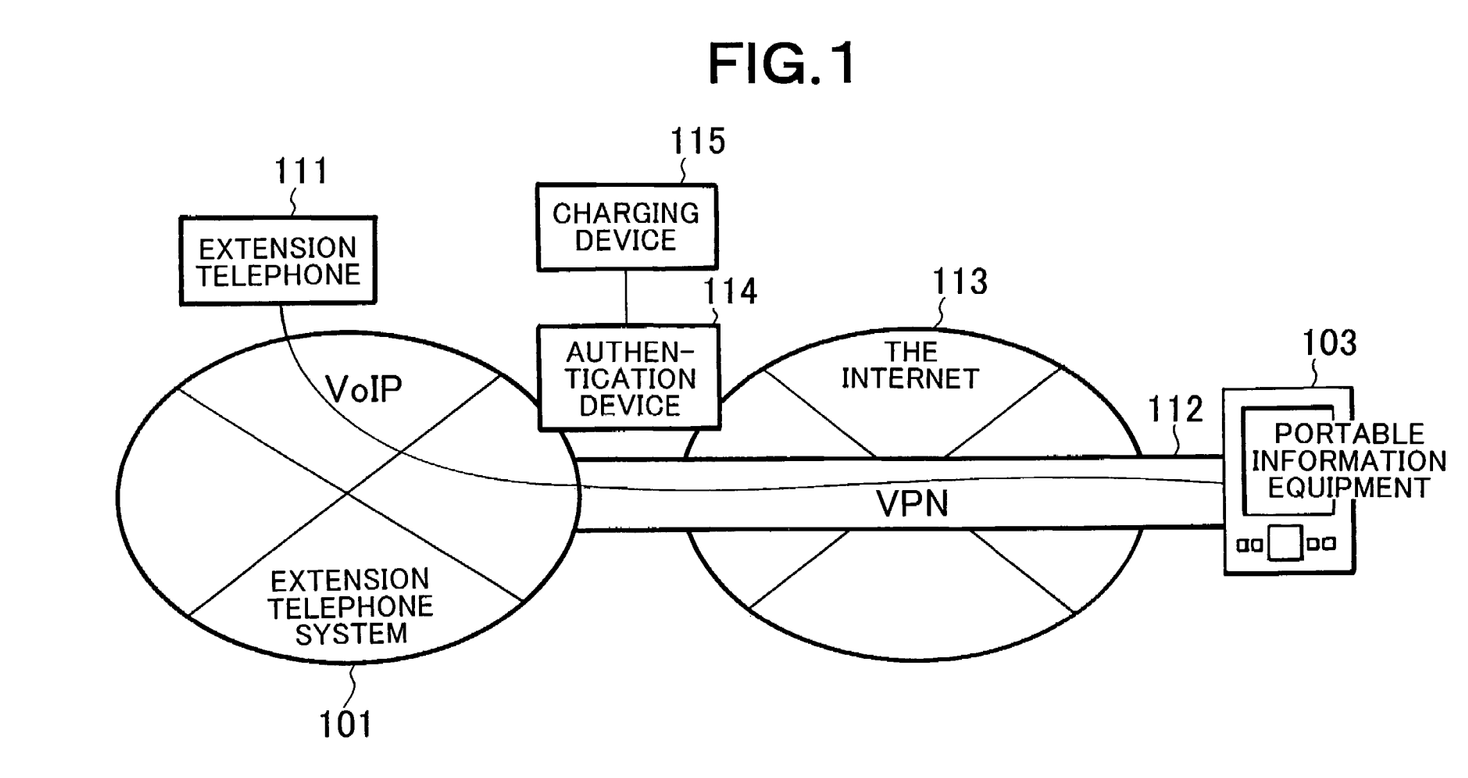
FIG. 1 is a conceptual view showing a connection relation of the portable information equipment/extension telephone connecting system of the embodiment of the present invention.

Referring to FIG. 1, a portable information equipment 103 is connected to an extension telephone 111 on an extension telephone system 101 through a virtual private network (VPN) system 112 on the Internet 113. The portable information equipment 103 communicates with the extension telephone using a protocol such as Voice over Internet Protocol.

At the entrance of the extension telephone system 101 are an authentication device 114 and a charging device 115. The authentication device 114 authenticates the portable information equipment 103, and the charging device 115 charges the portable information equipment 103 for the connection.

Figure 2:
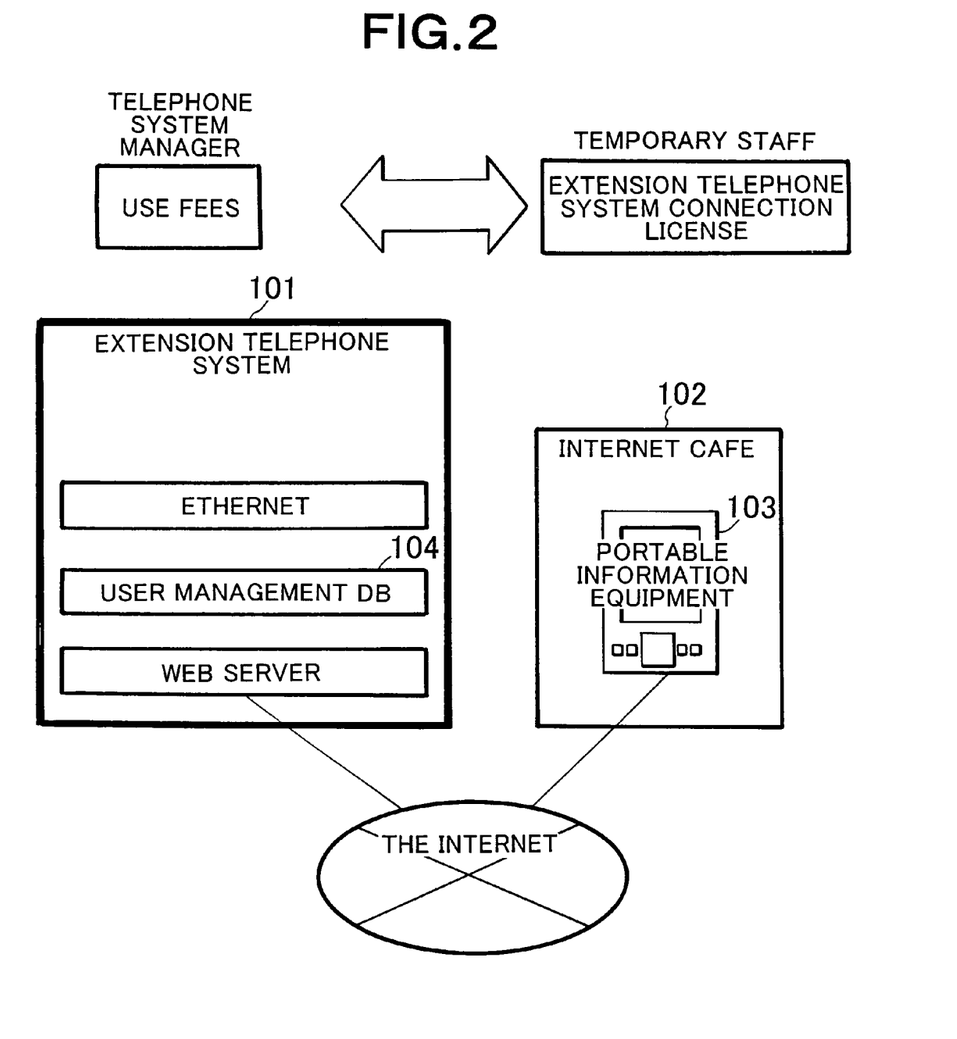
FIG. 2 is a block diagram showing a configuration of a system for connecting a portable information equipment and an extension telephone according to a first embodiment of the present invention.

FIG. 2 shows a configuration of a system for connecting a portable information equipment and an extension telephone according to the first embodiment of the present invention. Referring to FIG. 2, an extension telephone system 101, a portable information equipment 103 which is present in an Internet café 102, which can carry out radio LAN communications based on IEEE 802.11 standard or the like, and which has a world wide web (WWW) browser and an IP telephone function, and a user management database (DB) 104 are provided. According to the present invention, a temporary staff who has a license to use the extension telephone system 101 logs in the extension telephone system 101 from the Internet cafe 102 through a VPN system, thereby being given permission to use the extension telephone system.

To log in the extension telephone system 101 from the portable information equipment 103, an authentication system such as a remote authentication dial in user service (RADIUS) is used.

The portable information equipment 103 is connected to the extension telephone system by using VoIP. For the VoIP, H. 323 or Session Initiation Protocol (SIP) is used.

Charging of license fees to the temporary staff may be carried out at the time of logging-in, in accordance with the number of IP packets used for VoIP communication, or monthly.

Figure 3:
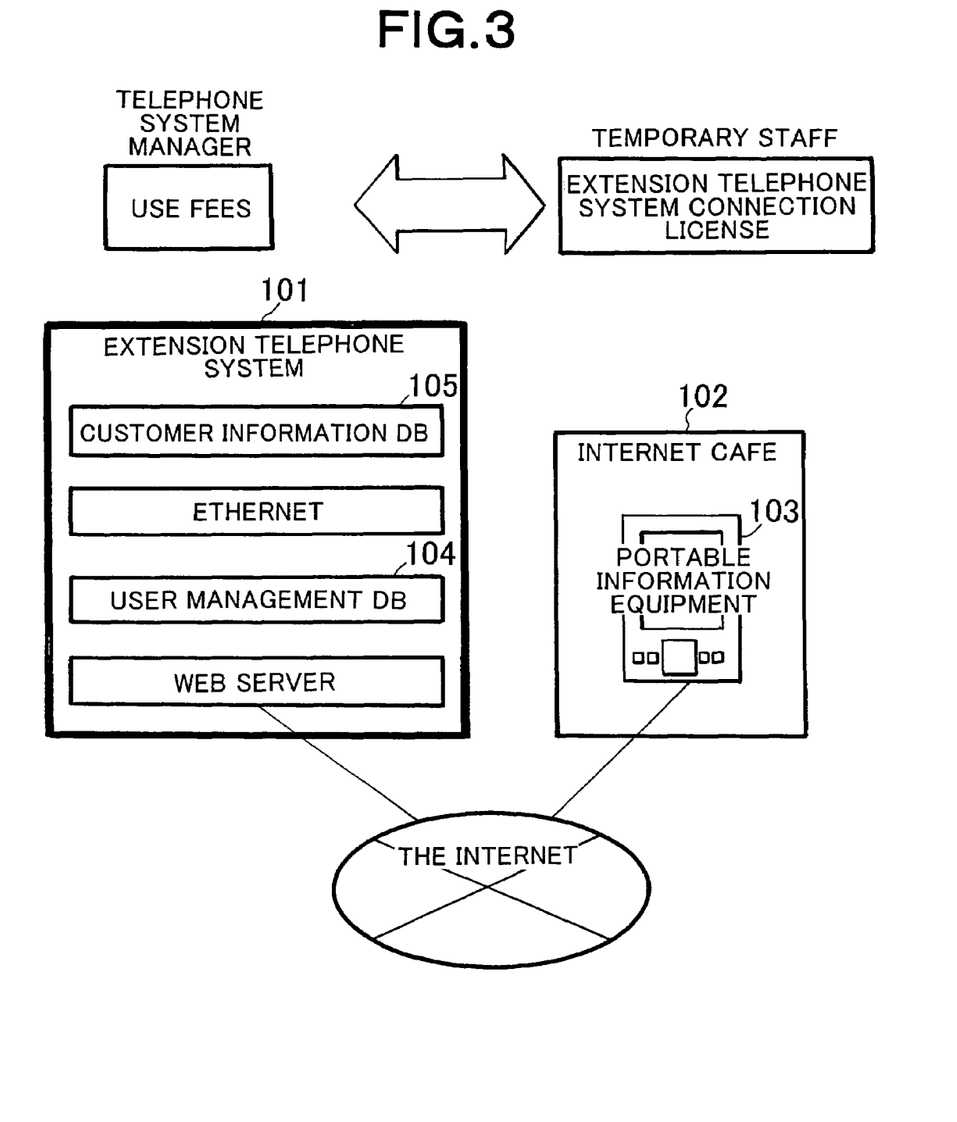
FIG. 3 is a block diagram showing a configuration of a system for connecting a portable information equipment and an extension telephone according to a second embodiment of the present invention.

FIG. 3 shows the system configuration when charging is carried out at the time of logging-in.

Accordingly, by paying the license fees, the temporary staff can freely use the extension telephone system 101 from the outside by using his own portable information equipment 103 anytime as in the case of a full-fledged employee. An effect can be provided in which a manager of the extension telephone system 101 can collect license fees, and security can be assured by licensing.

The telephone system manager issues a license to the temporary staff to permit use of the extension telephone system, and collects fees. By the portable information equipment 103, the temporary staff logs in the extension telephone system from a place in which the VPN can be accessed based on issued authentication, and thus can carry out inexpensive extension calls.

According to the first embodiment shown in FIG. 2, the company provides the license of the extension telephone system to the temporary staff. The company collects fees from the temporary staff. The temporary staff uses his own portable information equipment 103 at the Internet café 102 to log in the extension telephone system of the company from the browser, and thus can use an inexpensive IP telephone.

According to a second embodiment shown in FIG. 3, the telephone system manager issues a license to the temporary staff to permit use of the extension telephone system, and collects fees. The temporary staff logs in the extension telephone system by issued authentication, and can use customer information in a customer database (DB) 105 managed by the extension telephone system.

According to a third embodiment, a company A provides a license of an extension telephone system to a company B. The company A collects fees from the company B. The company B logs in the extension telephone system of the company A, and can use customer information in a customer database (DB) which the company A has.

According to a fourth embodiment, a telephone system manager issues a license to an outsider to permit use of an extension telephone system, and collects fees. A temporary staff logs in the extension telephone system by issued authentication, and can use all linked extension telephone systems.

Figure 4:
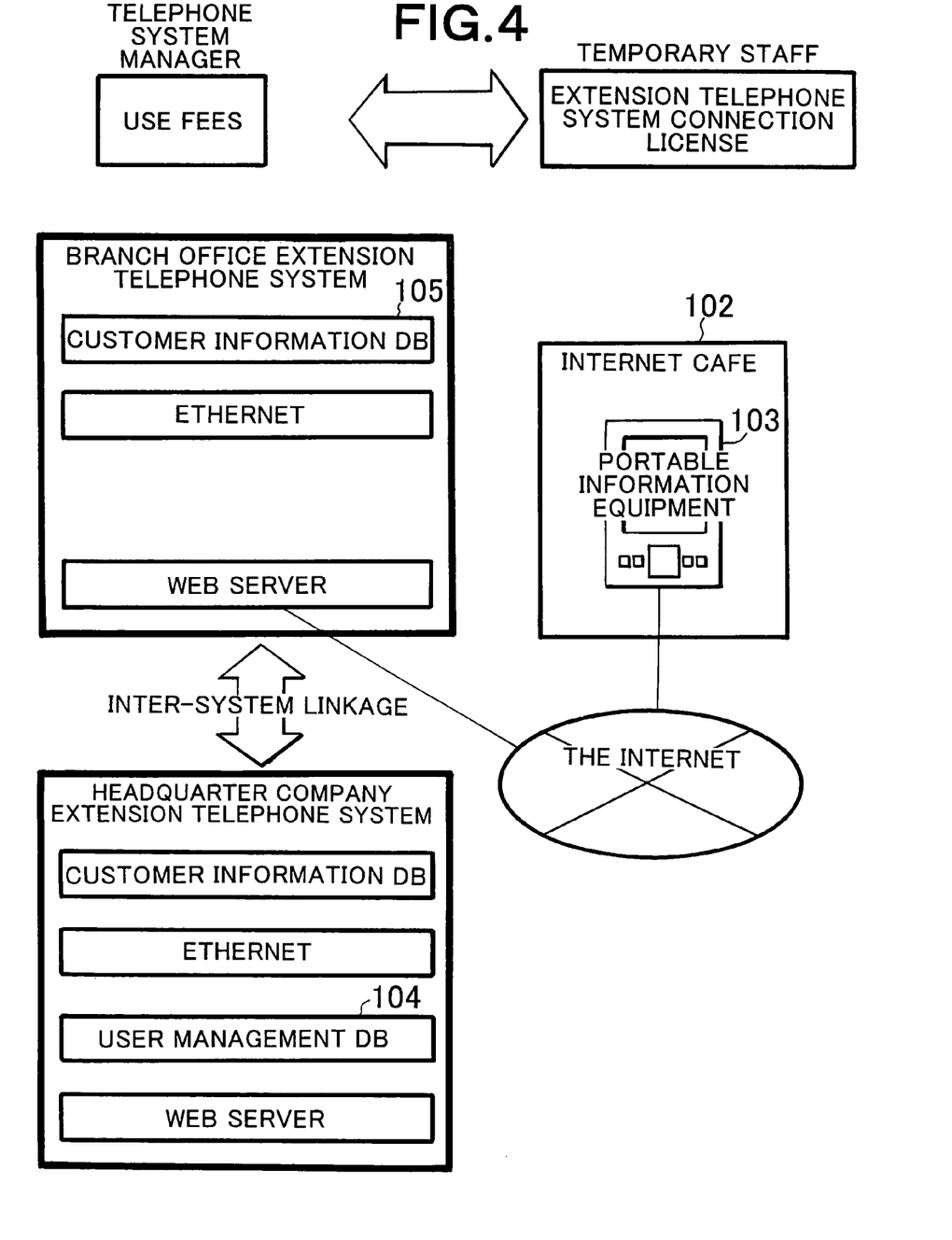
FIG. 4 is a block diagram showing a configuration of a system for connecting a portable information equipment and an extension telephone according to a fifth embodiment of the present invention.

According to a fifth embodiment shown in FIG. 4, a company provides a license to a temporary staff to connect to an extension telephone system. The company collects fees from the temporary staff. The temporary staff can use not only a telephone system of a headquarter company but also extension telephone systems of other branch offices which are linked by en-block authentication management.

Figure 5:
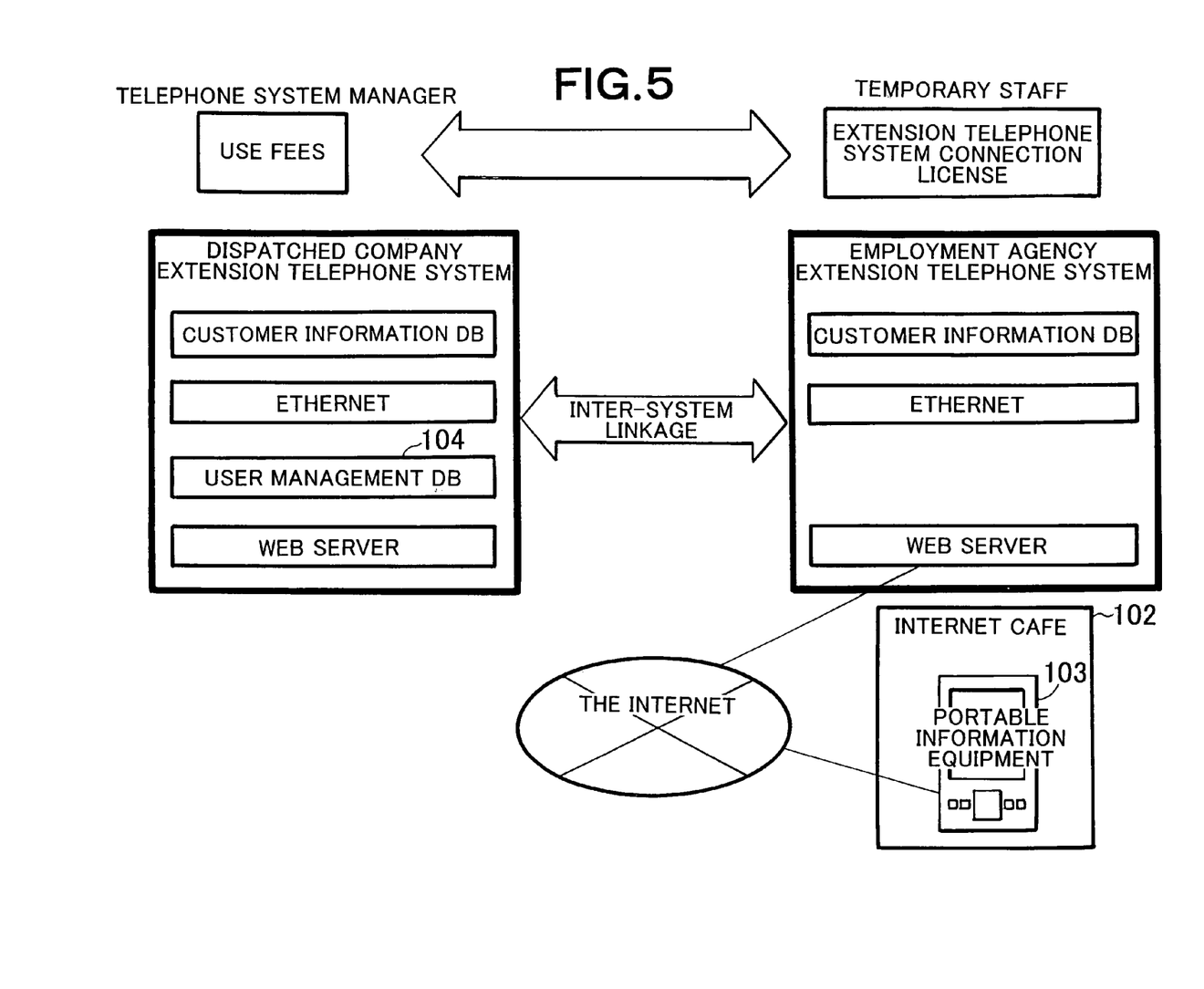
FIG. 5 is a block diagram showing a configuration of a system for connecting a portable information equipment and an extension telephone according to a sixth embodiment of the present invention.

According to a sixth embodiment shown in FIG. 5, a telephone system manager issues a license to an employment agency to permit connection to its in-company extension telephone system, and collects fees. The employment agency which has obtained the license can use the connected extension telephone system similarly to an extension.

According to a seventh embodiment, a company A provides a license to a company B to connect an extension telephone system. The company A collects fees from the company B. An extension telephone system of the company B is linked to the extension telephone system of the company A, and an inexpensive IP telephone can be used between the company A and the company B.

Figure 6:
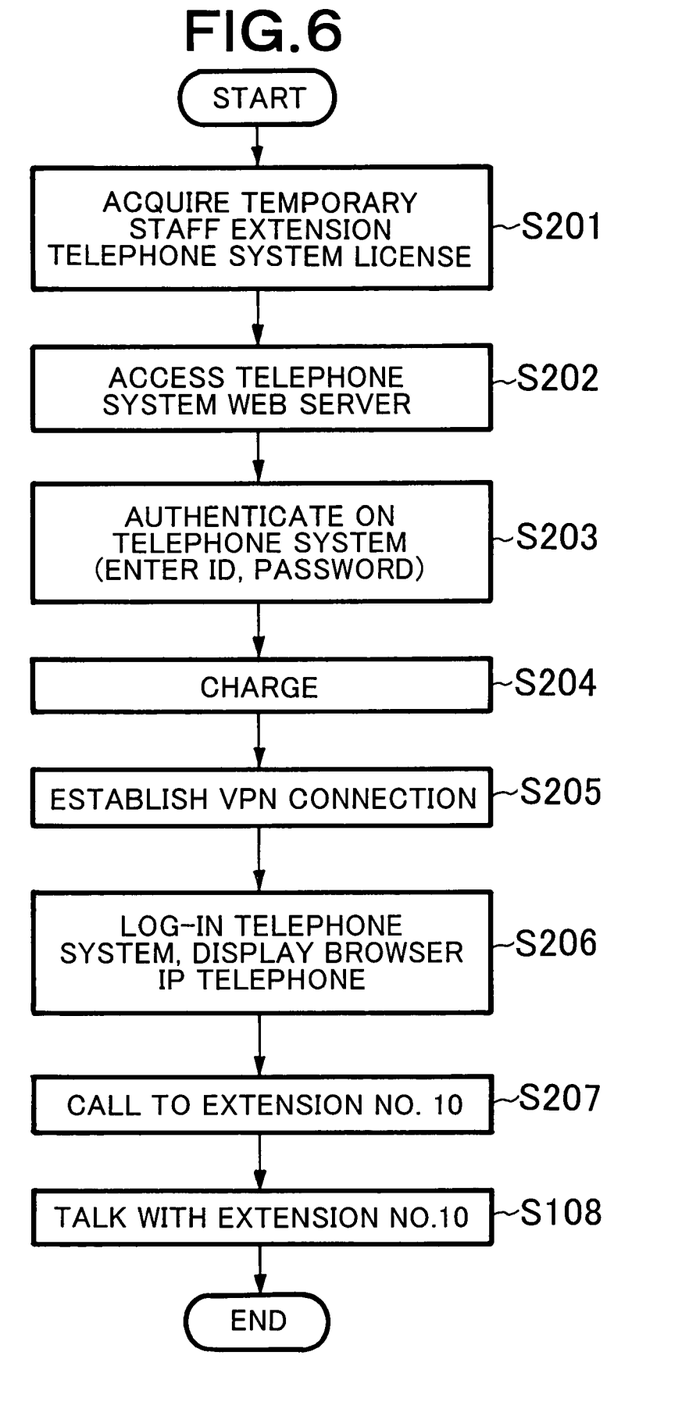
FIG. 6 is a flowchart showing an operation of the portable information equipment/extension telephone connecting system of the first embodiment of the present invention.

Next, an operation of the first embodiment shown in FIG. 2 will be described by referring to FIG. 6.

First, the company provides a license to the temporary staff to use the extension telephone system (step S201). Then, the temporary staff uses the portable information equipment 103 at the Internet café outside to access the WWW server of the extension telephone system of the company (step S202). Then, the temporary staff enters his own ID and password to receive authentication (step S203). Then, a charging device charges fees to the temporary staff (step S204). Then, connection of the portable information equipment 103 to the VPN is established (step S205). Then, the portable information equipment 103 displays an IP telephone screen on a browser screen (step S206). This screen includes buttons of, e.g., ten keys, on-hook and off-hook buttons, etc. Then, the temporary staff depresses a necessary button on the screen to call the extension 10 (step S207). Then, calling between the temporary staff and Mr./Ms. S of the extension is started (step S208).

Figure 7:
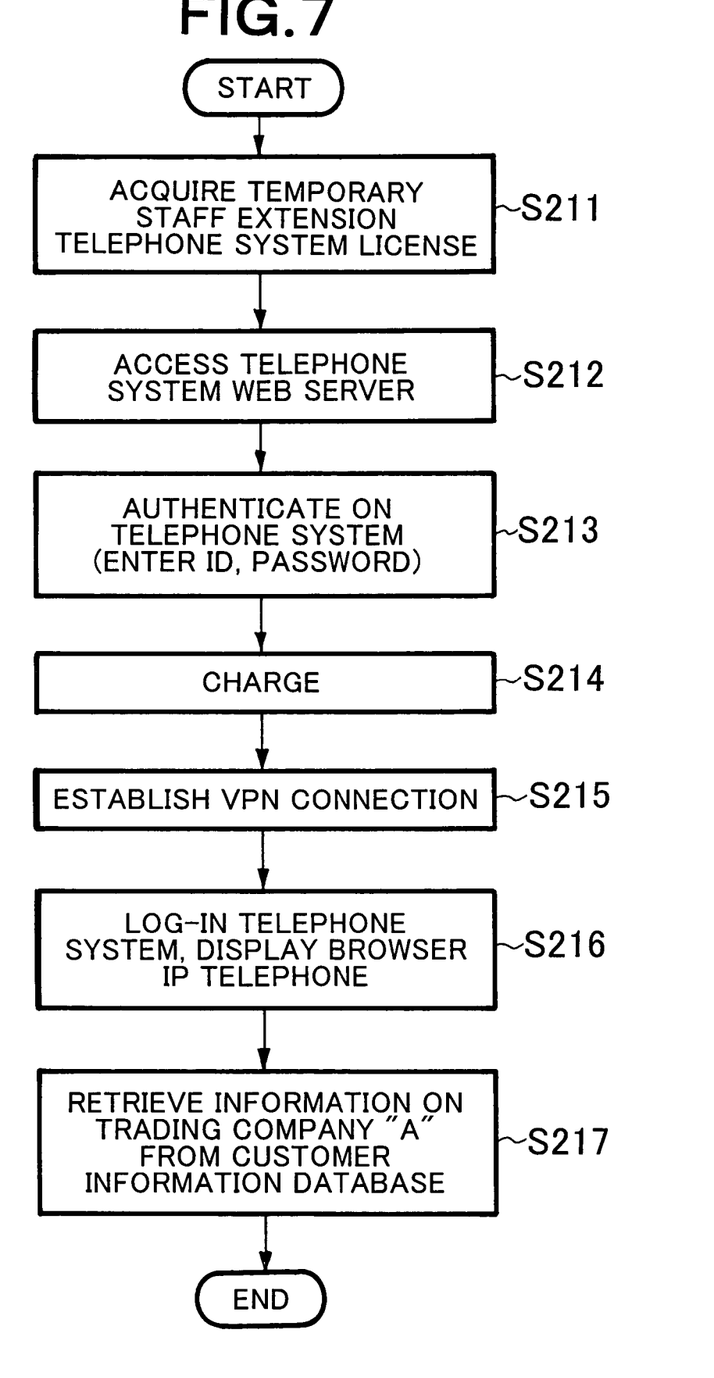
FIG. 7 is a flowchart showing an operation of the portable information equipment/extension telephone connecting system of the second embodiment of the present invention.

Next, an operation of the second embodiment shown in FIG. 3 will be described by referring to FIG. 7.

Steps S211 to S216 are similar to steps S201 to 206 of the first embodiment, and thus description thereof will be omitted. The IP telephone screen includes a button to move to a normal browser. Upon movement to the normal browser, the temporary staff accesses a homepage to display a content of the customer information database (DB) 105, enters search conditions on the homepage, and depresses a submit button. Accordingly, an SQL program or the like to retrieve data in the customer information DB 105 is started from the WWW server, and a homepage to display a result of the retrieval is sent to the portable information equipment 103. The portable information equipment 103 displays the homepage (step S217).

Figure 8:
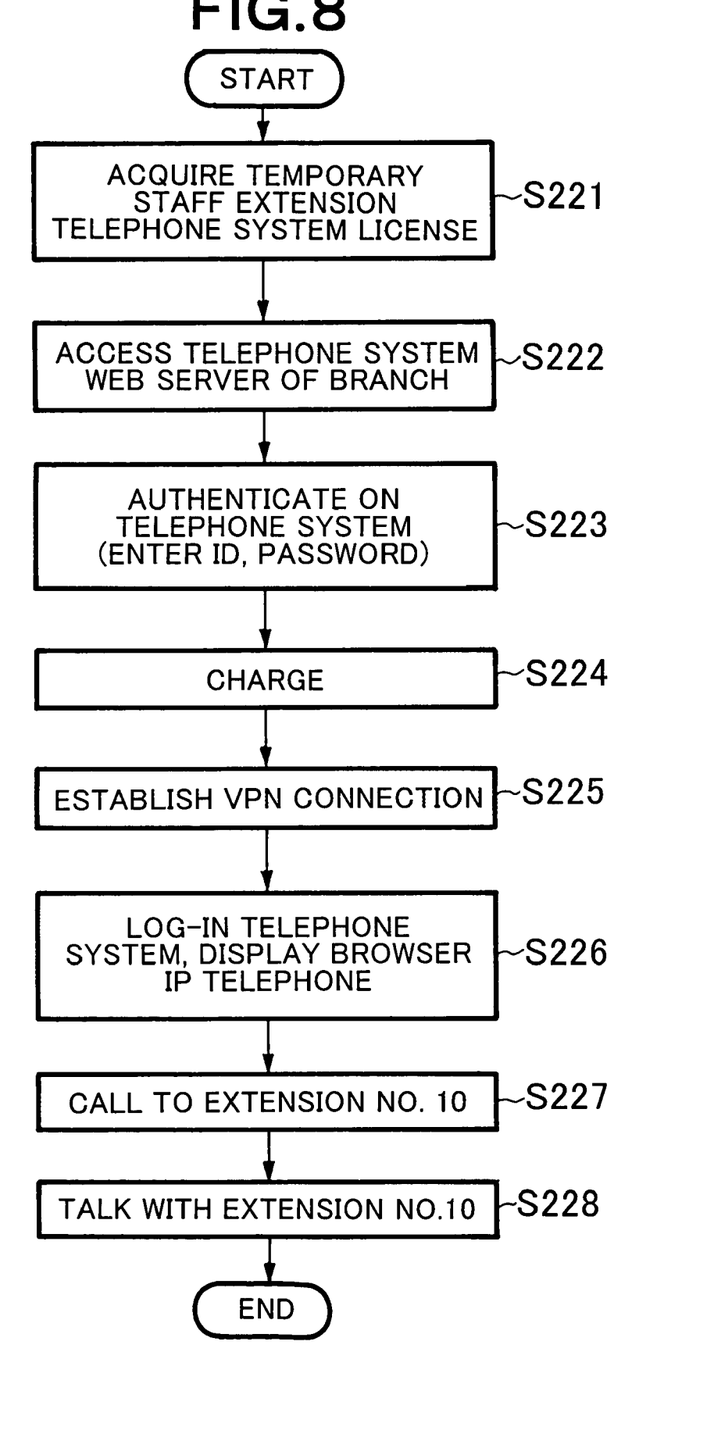
FIG. 8 is a flowchart showing an operation of the portable information equipment/extension telephone connecting system of the fifth embodiment of the present invention.

Next, an operation of the fifth embodiment shown in FIG. 4 will be described by referring to FIG. 8.

The company A provides a license to the temporary staff to use the extension telephone system. The temporary staff uses the portable information equipment 103 at the Internet café of a place of a business trip to access the Web server of the extension telephone system of the branch office B of the company A located at the visited place. The company A manages authentication of all the extension telephone systems of all the branch offices en block.

Steps S221 to S226 are similar to steps S201 to 206 of the first embodiment, and thus description thereof will be omitted. The temporary staff enters an ID and a password identical to those used for authentication of the extension telephone system of the headquarter company to receive authentication. After step S226, the temporary staff depresses a necessary button on the screen to call the extension 10 of the headquarter company B (step S227). Then, calling is started between the temporary staff and Mr./Ms. T of the extension 10 (step S228).

Figure 9:
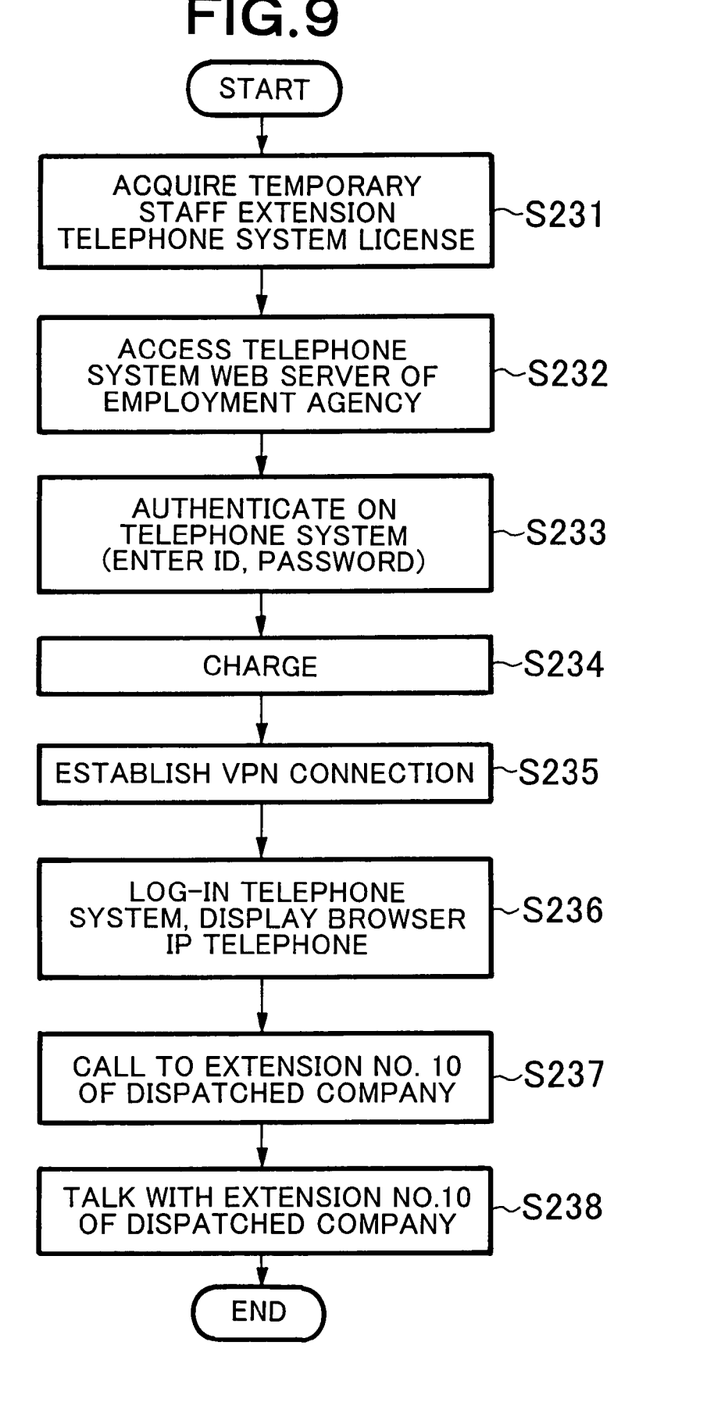
FIG. 9 is a flowchart showing an operation of the portable information equipment/extension telephone connecting system of the sixth embodiment of the present invention.

Next, an operation of the sixth embodiment shown in FIG. 5 will be described by referring to FIG. 9.

The dispatched company provides a license to the employment agency to use the extension telephone system. The extension telephone system of the employment agency is connected to the extension telephone system of the dispatched company. The dispatched company manages authentication of all the extension telephone systems en block.

Steps S231 to S236 are similar to steps S201 to 206 of the first embodiment, and thus description thereof will be omitted. After step S236, the temporary staff depresses a necessary button on the screen to call the extension 10 of the dispatched company (step S237). Then, calling is started between the temporary staff and Mr./Ms. U of the dispatched company (step S238).

The telephone system manager may issue a license to a group of outsiders to use the extension telephone system, and collect fees. In this case, an outsider included in the group of outsiders logs in the extension telephone system by issued authentication, and can use the extension telephone system.

Furthermore, the telephone system manager may limit a function of permitting use at the extension telephone system for each outsider, and differentiate fees. In this case, the outsider can use only a permitted function of the extension telephone system.

As described above, the present invention provides the following effects.

The telephone system provider can collect use fees of the in-company extension telephone system. Additionally, security can be maintained since authentication is carried out when the extension telephone system is used.

The extension telephone system lessee can use an inexpensive IP telephone without using an expensive portable or public telephone. Because of the use of the browser IP telephone, any kinds of terminals can be used as long as they have browser functions. A telephone call can be made to the extension telephone even from the outside. The customer information managed by the extension telephone system can be used. Furthermore, a plurality of linked extension telephone systems can be used.

What is claimed is:

1. A system for connecting a portable information equipment and an extension telephone, comprising:

an extension telephone system connected to the extension telephone;

extension telephone connecting means for connecting the portable information equipment to the extension telephone system through a virtual private network (VPN), wherein the connecting performs an authentication of the portable information equipment and, based on the authentication, selects between connecting and not connecting the portable information equipment to the VPN;

Voice over Internet Protocol (VoIP) connecting means for connecting the authenticated portable information equipment connected to the extension telephone system to the extension telephone connected to the extension telephone telephone system by VoIP; and charging means for charging to the authenticated connected portable information equipment a fee based on a quantity of VoIP communication between said authenticated connected portable information equipment and the extension telephone.

2. The system according to claim 1, further comprising a database connected to the VPN, and wherein the portable information equipment is configured to access, by the VPN upon said extension telephone means authenticating and connecting the portable information equipment, the database connected to the VPN.

3. A method for connecting a portable information equipment and an extension telephone connected to an extension telephone system, comprising:

an extension telephone connecting step of connecting the portable information equipment to the extension telephone system through a virtual private network (VPN), wherein the connecting includes an authentication of the portable information equipment and, based on the authentication, selecting between connecting and not connecting the portable information equipment to the VPN;

a Voice over Internet Protocol (VoIP) connection executing step of connecting the portable information equipment connected to the extension telephone system to the extension telephone connected to the extension telephone system by VoIP; and a charging step of charging to the authenticated connected portable information equipment connected by the connecting step a fee based on a quantity of VoIP communication between portable information equipment and the extension telephone.

4. The method according to claim 3, further comprising:

providing a database connected to the VPN; and a step of the authenticated connected portable information equipment accessing, by the VPN, the database connected to the VPN.

* * * * *